Sept. 15, 1959      E. L. HALL      2,904,738
MOTOR CONTROLLER
Filed Sept. 21, 1956      2 Sheets-Sheet 1
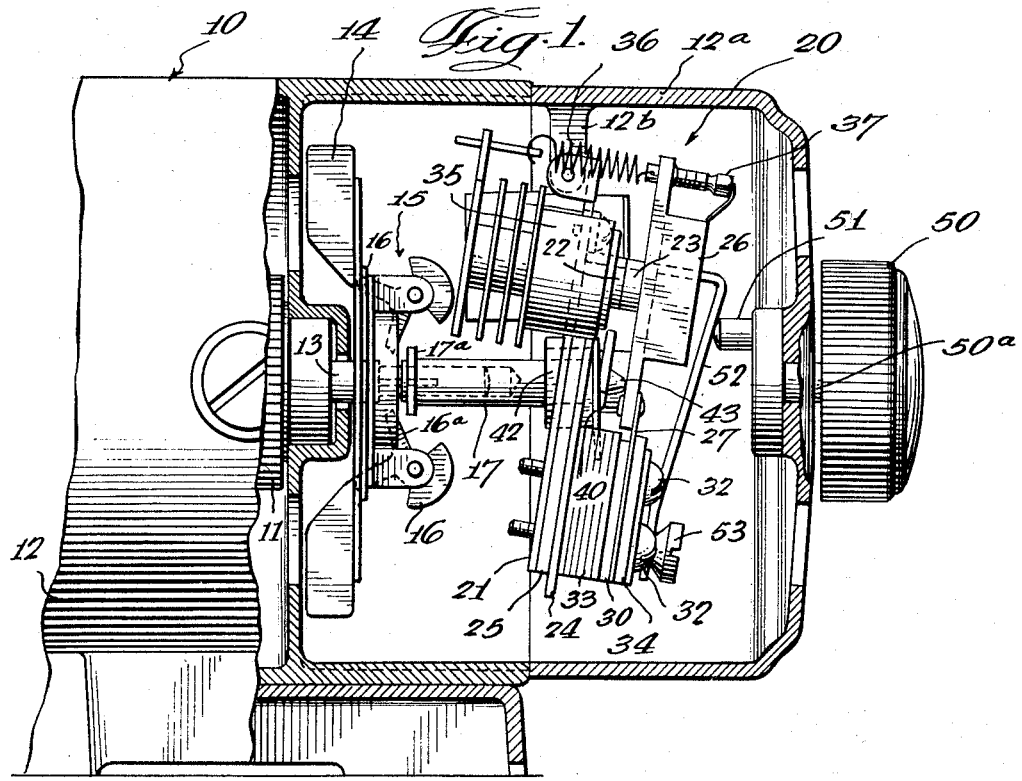
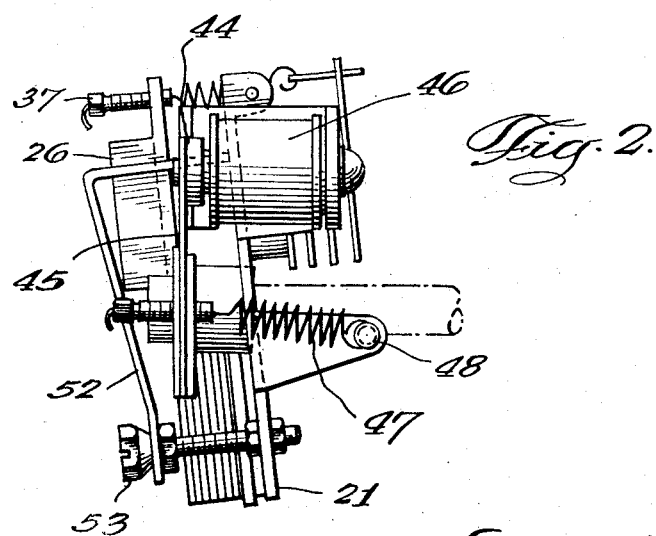
INVENTOR.
Emery L. Hall
BY
Schroeder, Hofgren, Brady & Wegner
attorneys

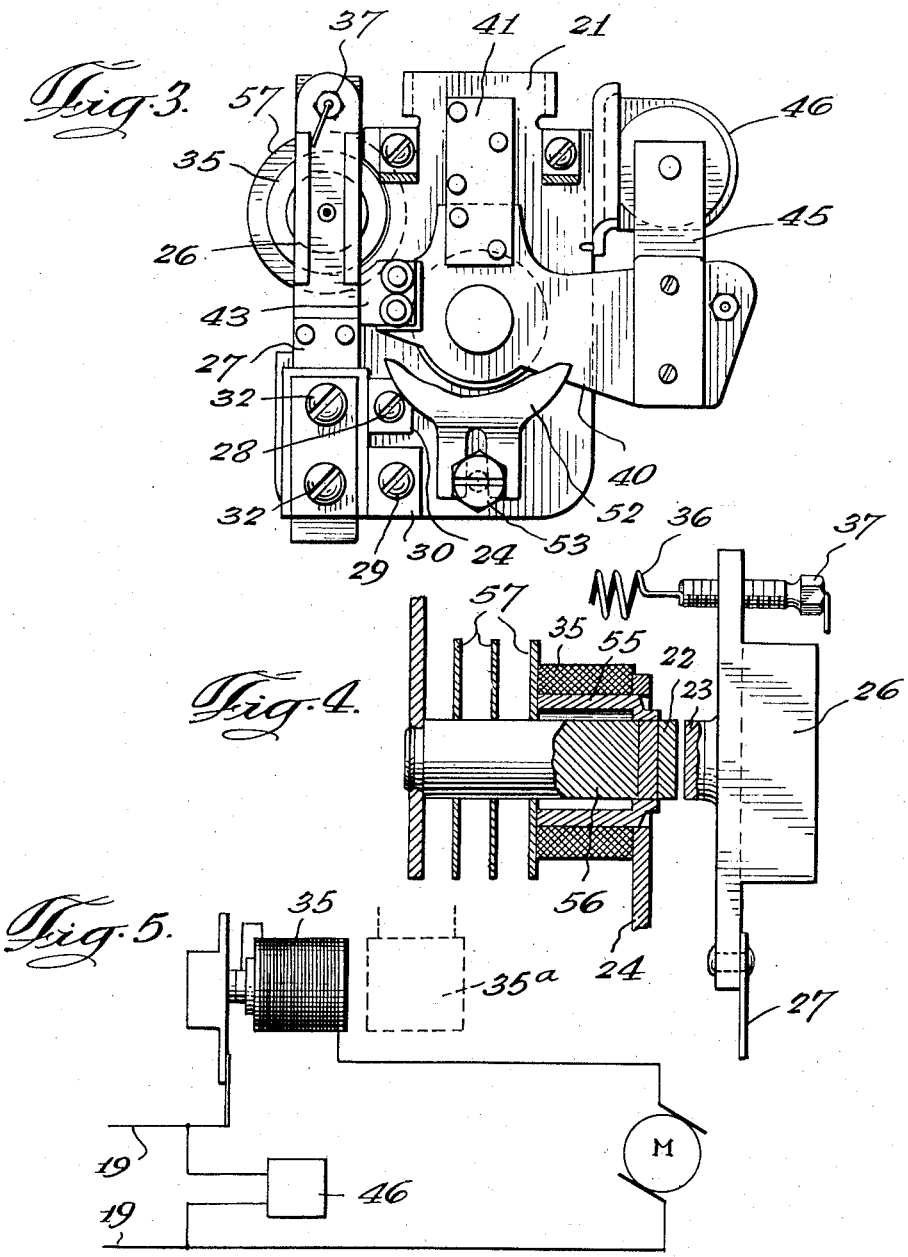

United States Patent Office 2,904,738
Patented Sept. 15, 1959

2,904,738

MOTOR CONTROLLER

Emery L. Hall, Hinsdale, Ill., assignor, by mesne assignments, to Whirlpool Corporation, a corporation of Delaware Application September 21, 1956, Serial No. 611,332

10 Claims. (Cl. 318—325)

This invention is concerned with a motor controller and more particularly with a speed controller for electric motors.

It is a general object of the present invention to provide a continuously variable speed control device for electric motors and particularly for alternating current motors.

One feature of the invention is the provision of a controller comprising circuit means for affecting the operation of the motor, speed responsive means for actuating the circuit means to maintain a desired motor speed, and means operable as a function of the phase of the voltage applied to the motor for affecting the actuation of the circuit means by the speed responsive means. Another feature is that the last mentioned means includes a vibrator operated by a coil connected in parallel with the motor.

A further feature is the provision of a controller including a pair of separable contacts for affecting the operation of the motor, a governor, means responsive to the governor for affecting separation of the separable contacts to maintain a desired motor speed, and means for modifying the action of the governor responsive means as a function of the phase of the voltage of the power source to which the motor is connected.

Still another feature is that the contacts are mounted on a base plate, a member is movably mounted on the base plate and has a portion engageable with the movable contact to effect separation thereof, the vibrating means are connected with the other end of the member and the speed responsive means act on the member at a point intermediate its ends. A further feature is the provision of spring means for modifying the action of the controller. And another feature is the provision of means for adjusting the speed at which the motor operates.

The motor controller of this invention will be described as related to the embodiment shown in the accompanying drawings. Of the drawings:

Figure 1 is a fragmentary side elevation view of the motor with a portion of the casing broken away to show the motor controller;

Figure 2 is a side view of the controller taken from the side opposite the view of Figure 1;

Figure 3 is an elevational view of the controller taken from the right of Figure 1, with a portion broken away;

Figure 4 is an enlarged detail view of the contact structure; and

Figure 5 is a schematic circuit diagram.

Many types of motor speed controllers are known and one which is used quite widely for A.C. motors utilizes a speed responsive governor which opens a set of contacts in series with the motor when the motor speed becomes excessive. This removes the excitation from the motor so that it slows down permitting the contacts to close. In operation the contacts will open and close periodically maintaining the average speed of the motor at the desired value. Such controls have been found, however, to be practical only when used with relatively small motors, as those of less than one quarter horsepower in size. The current drawn by larger motors is so great that the repeated, uncontrolled opening and closing of the contacts results in arcing and overheating which soon destroys the contacts. With the present invention, the contacts are so controlled that, in steady state operation, they open on each half cycle and at a time when the current is relatively low.

Turning now to Figure 1 of the drawings, a motor 10 is shown having an armature 11 mounted in suitable bearings within a housing 12. Mounted on the shaft 13 of the motor is a fan 14 for circulating air through the motor housing. Also mounted on the armature shaft 13 is a speed responsive device or governor of the character described in Sparklin Patent 2,532,345, issued December 5, 1950. As described more fully in the Sparklin patent, the governor includes speed responsive members in a housing 16 which cause outward movement of arms 18a of bell cranks 18 on increasing motor speed. A sleeve 17 is slidably mounted on the armature for rotation therewith and has longitudinal sliding movement thereon. With increasing motor speed, the arms 18a of the bell cranks engage shoulder 17a of the sleeve moving it toward the right.

The motor controller, indicated generally as 20, has a base plate 21 which is pivotally suspended from a bracket 12b formed on the interior of an extension 12a of the motor casing.

Referring now also to Figures 2 and 3, it will be seen that the controller 20 includes a pair of contacts 22 and 23 which are connected in the circuit of the motor, preferably, as shown in Figure 5, in series with the connection between the motor and leads 19 which are in turn connected to a suitable source of power, as 110 volts, 60 cycle alternating current. Contact 22 is fixed to a relatively rigid plate 24 of conductive material, as copper, which in turn is fixedly mounted on base plate 21 but electrically insulated therefrom by a spacer 25 of insulating material. Contact 23 is carried by a weighted member 26 which is mounted on base member 21 by means of a flexible leaf element 27, preferably of spring steel. Electrical connections may be made to contacts 22 and 23 by means of binding screws 28 and 29 respectively, the screw 28 being threaded into the lower portion of conductor 24 and the screw 29 being threaded into a conductor 30, preferably of copper. Screws 32 secure the contact assembly, together with insulating spacers 25, 33 and 34 to base plate 21. The movable contact sub-assembly, including the contact 23, weighted member 26 and mounting member 27 is so designed that it has a natural frequency of vibration of twice the frequency of the source voltage, e.g., 120 c.p.s. where the source voltage is 60 cycles.

Mounted immediately behind fixed contact 22 is a coil 35 connected in series with the contacts and the motor, as shown in Figure 5. This coil sets up a magnetic field which acts on the weighted contact member 26, which is of a magnetic material, tending to keep the contacts closed when a current flows therethrough. Coil spring 36 urges the contacts toward the closed position with a force which may be adjusted by manipulation of threaded bushing 37.

An elongated member 40 is movably suspended from the base plate by a leaf of flexible, and preferably springy material 41. Mounted at an intermediate point of elongated member 40 is a bearing cup 42 into which the end of longitudinally movable, speed responsive sleeve 17 projects. A suitable bearing (not shown) as a ball member may be provided between the speed responsive sleeve 17 and cup 42. One end of elongated member 40 has a contact pusher member 43 mounted thereon, but insulated therefrom, the pusher member being positioned adjacent the support 26 for movable contact 23. Thus, as the speed of the motor increases, sleeve 17 moves toward the right, as shown in Figure 1, exerting a continually increasing force on member 40, tending to separate contacts 22 and 23.

Mounted on the end of elongated member 40 opposite pusher member 43 is a vibrator including a weight 44 supported by a strip of spring steel 45, the weight and support being designed to have a natural frequency of vibration of 120 cycles per second. The vibrator is caused to operate at a fixed phase relationship with the voltage of the power source by a vibrator coil 46 connected in parallel with the motor. The coil is preferably primarily resistive so that the vibrator operates in substantial phase synchronism with the source voltage. An adjustable coil spring 47 is connected between the end of member 40, adjacent the vibrator and an extension 48 on base member 21 to provide a control over the amplitude of the vibrations.

In operation, after the motor has reached its steady state speed, the vibrator causes elongated member 40 to vibrate about its point of bearing on speed responsive sleeve 17 exerting a force to separate contacts 22 and 23 for a portion of each half cycle. The mechanical force tending to separate the contacts, a composite force resulting from the speed responsive sleeve 17 and the vibrator, must overcome the constant mechanical force of spring 36 and the magnetic bias due to coil 35 in order to separate the contacts and break the motor circuit. As the magnetic bias varies with the instantaneous amplitude of the motor current, separation will occur at a relatively low value of current, reducing arcing and contact wear. Under stable operating conditions, the contacts will be closed for a portion of each half cycle just sufficient to supply enough power to the motor to satisfy the load driven thereby and make up the internal losses of the motor.

When the motor is accelerating, the speed responsive member 17 is far enough to the left, as viewed in Figure 1, so that the vibration of member 40 is insufficient to separate the contacts; and conversely when the motor is decelerating the contacts may remain open for a period of several cycles.

An external control over the speed of the motor is provided by an adjustment knob 50 which is mounted on the outside of casing extension 12a. A shaft 50a carried by the knob is connected with a pin 51 mounted eccentrically with respect to the shaft. The pin 51 bears against an inclined cam plate 52 which is mounted on controller base plate 21. Rotation of knob 50 varies the position of base plate 21 with respect to the speed responsive sleeve 17 and thus varies the force applied to member 40 by the speed responsive sleeve for any given motor speed. The angle of inclination of cam plate 52 may be varied by adjustment screw 53 to calibrate the adjustment knob.

Adjustment of spring 36, which urges the contacts 22 and 23 together, provides an additional means for calibrating the speed controller and also effects the size of the air gap on separation of the contacts. This provides a measure of control over the heat developed in the contacts. Adjustment of spring 47 varies the amplitude of the vibrations imparted to member 40 by the vibrator.

An additional winding 35a may be added to the coil 35, as indicated in broken lines in Figure 5. The winding 35a may be connected with an external source of power, preferably direct current, through a variable resistor to provide speed control from a remote point.

Turning now to Figure 4, the structure of the separable contacts will be described in more detail. Contacts 22 and 23 are of a suitable material, preferably tungsten or an alloy. Movable contact 23 as previously described, is secured to a supporting weight member 26 of magnetic material. Surrounding the fixed contact 22 is a sleeve 55 of iron on which the coil 35 is wound. Extending through the sleeve 55 and spaced therefrom is a rod 56, of a good heat conductive material, preferably copper. The rod 56 projects out of sleeve 55 and carries thereon a plurality of fins 57 which aid in the dissipation of the heat developed in the contacts. In addition, the sleeve 55 surrounding contact 22 concentrates the flux set up by coil 35 in an annular field. This field has the effect of distributing the ionized air created on separation of the contacts over the entire surface of the contacts causing the arc resulting from the opening of the contacts to form at different points of the contact surface, reducing damage to the contacts during operation. The operation of the particular contact structure is described more fully and claimed in my copending application, Serial No. 618,374, filed October 25, 1956 and assigned to the assignee of this application.

Having described my invention as related to the embodiment shown in the accompanying drawings, it is my intention that the invention be not limited by any of the details of description unless otherwise specified, but rather be construed broadly within the spirit and scope as set out in the accompanying claims.

I claim:

1. A controller of the character described for a motor arranged to be energized from a source of alternating electrical power, comprising: circuit means, including separable contacts connected in series with said motor for affecting the operation of the motor; a coil connected in series with said separable contacts and with said motor and disposed adjacent said contacts to bias them magnetically toward closed position; speed responsive means operably connected for actuating said separable contacts to maintain a desired motor speed; and vibrating means, including a coil connected across said source of power, operable as a function of the phase of the voltage applied to said motor, and operably connected for actuating periodically said separable contacts.

2. A controller of the character described for a motor arranged to be energized from a source of alternating electrical power, comprising: a base plate; a pair of contacts mounted on said base plate, one of said contacts being movable with respect to the other; a member movably mounted on said base plate and having an end portion engageable with said movable contact to effect separation of the contacts; vibrating means operable in accordance with the phase of the voltage of said power source connected with the other end of said member; and speed responsive means acting on said member at a point intermediate its ends for effecting separation of said contacts to control the speed of said motor.

3. A controller of the character described in claim 2, wherein said base plate is movably mounted with respect to said speed responsive means.

4. A controller of the character described for a motor arranged to be energized from a source of alternating electrical power, comprising: a base plate; a pair of contacts mounted on said base plate, one of said contacts being movable with respect to the other; a member movably mounted on said base plate and having an end portion engageable with said movable contact to effect separation of the contacts; vibrating means operable in accordance with the phase of the voltage of said power source connected with the other end of said member; speed responsive means acting on said member at a point intermediate its ends for effecting separation of said contacts to control the speed of said motor; and spring means for modifying the action of said controller.

5. A controller of the character described for a motor arranged to be energized from a source of alternating electrical power, comprising: a base plate; a pair of contacts mounted on said base plate, one of said contacts being movable with respect to the other; a spring biasing said contacts toward closed position; a member movably mounted on said base plate and having one end portion engageable with said movable contact to effect separation of the contacts; a second spring acting on said member biasing said portion in a direction to effect separation of said contacts; vibrating means operable in accordance with the phase of the voltage of said power source connected with the other end of said member; and speed responsive means acting on said member at a point intermediate its ends for effecting separation of said contacts to control the speed of said motor.

6. A controller of the character described for a motor arranged to be energized from a source of alternating electrical power, comprising: a base plate; a pair of contacts mounted on said base plate, one of said contacts being movable with respect to the other; a member movably mounted on said base plate and having an end portion engageable with said movable contact to effect separation of the contacts; vibrating means operable in accordance with the phase of the voltage of said power source connected with the other end of said member; speed responsive means associated with said motor and acting on said member at a point intermediate its ends for effecting separation of said contacts to control the speed of said motor; and means for varying the position of said base plate relative to said speed responsive means.

7. A controller of the character described in claim 6, wherein said last mentioned means include an inclined cam plate mounted on said base plate and an eccentric pin movably mounted for engagement with the cam plate.

8. A controller of the character described for a motor arranged to be energized from a source of alternating electrical power, comprising: circuit means, including separable contacts actuable to affect the power delivered to the motor from the source thereby to regulate the speed of the motor; a coil connected in series with said separable contacts and disposed adjacent said contacts to bias them magnetically toward closed position; speed responsive means operably connected for actuating said separable contacts to maintain a desired motor speed; and vibrating means, including a coil connected across said source of power, operable as a function of the phase of the voltage applied to said motor, and operably connected for actuating periodically said separable contacts.

9. A controller of the character described for a motor arranged to be energized from a source of alternating electrical power, comprising: a base plate; a pair of contacts mounted on said base plate, one of said contacts being movable with respect to the other; a member movably mounted on said base plate and having an end portion engageable with said movable contact to effect separation of the contacts; vibrating means operable in accordance with the phase of the voltage of said power source including a coil and and armature continuously vibrated thereby, said armature being connected with said member; and speed responsive means acting on said member for effecting separation of said contacts to control the speed of said motor.

10. A controller of the character described for a motor arranged to be energized from a source of alternating electrical power, comprising: circuit means, including a fixed contact and a movable contact actuable to affect the power delivered to the motor from the source, thereby to regulate the speed of the motor; means responsive to the speed of said motor; a member actuated by said speed responsive means for separating said contacts to control the speed of the motor; and vibrating means operable in accordance with the phase of the voltage of said power source including a coil and an armature continuously vibrated thereby, and a connection between said armature and said movable contact, vibration of said armature acting through said connection to urge said movable contact away from said first contact.

References Cited in the file of this patent

UNITED STATES PATENTS

| | | |
|---|---|---|
| 1,918,203 | Wise | July 11, 1933 |
| 2,794,163 | Hall et al. | May 28, 1957 |